(12) United States Patent
Elteto

(10) Patent No.: US 6,463,538 B1
(45) Date of Patent: Oct. 8, 2002

(54) METHOD OF SOFTWARE PROTECTION USING A RANDOM CODE GENERATOR

(75) Inventor: Laszlo Elteto, Irvine, CA (US)

(73) Assignee: Rainbow Technologies, Inc., Irvine, CA (US)

( * ) Notice: Subject to any disclaimer, the term of this patent is extended or adjusted under 35 U.S.C. 154(b) by 48 days.

(21) Appl. No.: 09/222,002

(22) Filed: Dec. 30, 1998

(51) Int. Cl.[7] .............................................. G06F 12/14
(52) U.S. Cl. ...................................................... 713/190
(58) Field of Search ................................. 713/190, 187, 713/193, 200; 380/28, 46; 717/114, 162

(56) References Cited

U.S. PATENT DOCUMENTS

| | | | | |
|---|---|---|---|---|
| 4,562,305 A | * | 12/1985 | Gaffney, Jr. ............... | 178/22.08 |
| 5,123,045 A | * | 6/1992 | Ostrovsky et al. ............ | 380/46 |
| 5,530,752 A | * | 6/1996 | Rubin ........................... | 380/4 |
| 5,631,907 A | * | 5/1997 | Guarneri et al. ............ | 370/474 |
| 5,724,345 A | * | 3/1998 | Guarneri et al. ............ | 370/316 |
| 6,009,525 A | * | 12/1999 | Horstmann ................... | 713/200 |
| 6,088,452 A | * | 7/2000 | Johnson et al. ............... | 380/28 |
| 6,334,189 B1 | * | 12/2001 | Granger et al. ............. | 713/200 |

OTHER PUBLICATIONS

International Search Report in PCT Application No. PCT/US99/31148 dated Apr. 26, 2000.

* cited by examiner

*Primary Examiner*—Matthew Smithers
(74) *Attorney, Agent, or Firm*—Foley & Lardner

(57) ABSTRACT

The computer-based software protection systems are provided using methods that improve the protection of vendor's software against unauthorized use. A code generator generates randomized protection code, which is then used to protect the application software. Because the code is unique for each protected software, potential crackers have to analyze and crack every instance of the protection, so that generic hack is almost impossible. Some embodiments of the present invention also randomize license verification module, add and randomize a specific anti-hacking code, and randomize the protection code execution sequence(s). The same embodiments can also select which instructions and how many instructions are randomized. Moreover, these embodiments select where the data is being stored, in which register, memory address and stack position, and also randomize variable offsets. Other embodiments of the present invention are used for interpreted code.

23 Claims, 5 Drawing Sheets

METHOD OF SOFTWARE PROTECTION USING A RANDOM CODE GENERATOR

BACKGROUND OF THE INVENTION

1. Field of the Invention

The present invention relates generally to the field of computer software protection against unauthorized use, and more particularly to an improved method for protection of vendor's computer software uniquely and unpredictably, to deter unauthorized use.

2. Related Art

The field of computer software protection is developing rapidly and there is presently a variety of means for protecting computer software from unauthorized use, including hardware and software protection. The need for protecting computer software arises for several reasons. Some individuals and institutions may attempt to use computer software without proper licensing. Others may try to gain unauthorized access to computers.

Some protection methods used by computer security vendors require insertion, within the protected software, of specific software security modules, commonly referred to as callable security checks. The software security modules, in the course of protected software execution, verify whether the protected software is properly licensed. The methods employed in order to enable execution of protected software applications without proper licensing include disabling or removal of protection code, such as license verification modules, from the protected computer software. The adversaries who specialize in disabling or removal of the protection code are often referred to as "crackers", and successful disabling or removal of the protection code, such as a license verification module, is referred to as a "hack".

Another protection method includes performing an automatic security or code protection check, by wrapping the original software application in a protective layer code, commonly referred to as shelling technology, and executing the protective layer code before executing the original application code. Therefore, the protective layer code verifies for proper licensing of the computer software and performs code protection. The shelling technology often has additional routines for encrypting the original application code for code protection. However, the shelling protective layer code is the same for all users of the particular original software application, and it is not hard to hack by cutting off the protective layer code or only the first few instructions of the start up code.

In order to be able to disable or remove the protection code, such as the license verification module, the crackers first have to understand the protection code operation and then to employ the necessary means and techniques to hack the code. To understand the protection code, such as license verification module, it is usually necessary to debug and then disassemble or decompile the protected computer software or its particular part.

Mutating code is used in some computer viruses. Usually, the mutating code is limited to a small initial portion of the virus code, which self-decrypts the embedded, fixed virus code. Then, an anti-virus software application tries to execute the small initial portion of the mutating code, and, if successful, the fixed virus code is exposed and compared with a list of known virus codes. The software application of Software Security, Inc., named UniKey ToolBox library (versions prior to version 4), utilizes a small startup section generated uniquely for each of its customers. The startup code is used to decrypt the remaining, fixed library code. The purpose of the startup code is similar to the mutating virus code, to make it harder to identify the code using a simple comparison.

When security vendors make their software protection software applications commercially available, they distribute copies of the same software protection software application, which realizes a particular method of software protection, such as a decryption key, to many or all their customers. The pitfall of this approach is that a cracker has to analyze and understand the security software application only once, and then the disabling or removal of the license verification module can be performed on all application software modules protected by this particular vendor's security software application.

This hacking approach is commonly referred to as a "generic hack". It disables the security vendor's software protection software application by distribution of the hack procedure or the now-unprotected version of the software to many individuals. In the past, the effect of such a generic hack only had limited impact, within a particular local market where the cracker operating and a local market where the software was distributed. However, in the age of global networks, such as Internet, a generic hack technique, or a decryption code, can easily and effectively be distributed worldwide by means of e-mail, hacker discussion forums or Web sites, resulting in a severe impact on security vendors, their software protection software applications and customers.

Another hack technique includes protecting a whole package of application software with the same tool routine. For example, the tool routine may XOR a parameter value with the code. The parameter value may be different for each program, but the technique is the same and the code execution pattern is the same. Therefore, when a cracker breaks one application, it is easy to hack the others.

Yet another approach is to use a library (fixed set) of protection tool routines. When a protection software runs, it picks randomly a library tool routine from the fixed set of tool routines and applies it. However, a hacker can get the library of protection tool routines easily, e.g., from a demo version of the tool routines or as a valid purchaser of the tool routine library.

Still another approach is to randomize the parameter values used in the particular protection tool, to be added to the protective software algorithm. However, the tool algorithm remains the same every time the software runs, and if hacked, the technique can be easily distributed.

Accordingly, there is a need in the art for a security software application, using a method for protection of vendors' computer software uniquely and unpredictably, to deter unauthorized use.

SUMMARY OF THE DISCLOSURE

Therefore, preferred embodiments of the present invention provide an advantage of improving the security features of protection computer software in such a way that prevents hacks, more particularly generic hacks. According to preferred embodiments of the present invention, this advantage is achieved by thoroughly randomizing the protection code.

Some embodiments of the present invention include a computer-based software protection system using a method for run-time randomization and creation of a new algorithm and code each time an original software application is protected. A random source code generator is used for generating a plurality of randomized shelling include source files and a plurality of randomized run-time include files. A compiler and a linker are used for compiling and linking a shelling source code containing the randomized shelling include source files to create a shelling program binary code, and for compiling and linking a runtime source code including the randomized run-time include files to create a runtime binary code, whereby the created shelling program is useable to read the generated run-time binary code and the original software application, for creating a deliverable randomly protected software application executable code.

Other embodiments include a computer-based software protection system using a method for run-time randomization. The system has a shelling program, having a random binary code generator, for generating a random run-time shelling code and a random binary run-time code, whereby the created random run-time shelling code is useable to read the generated random run-time binary code and an original software application, for creating a randomly protected software application.

Other embodiments include a computer-based software protection system, useable by a language interpreter software, using a method for run-time randomization and protection of an interpretative computer software application byte code. The system includes a random bytecode generator for reading an original interpretative software application's bytecode and generating a randomly protected software application bytecode, and randomizing a protection code by the random bytecode generator, whereby a combination of the randomly protected software application bytecode and the randomized protection code is useable to create a randomly protected bytecode. Other aspects of these embodiments re-randomize the combined software application, thus creating the protected computer software where the execution of the license verification module is different for each instance of the application.

BRIEF DESCRIPTION OF THE DRAWINGS

Referring now to the drawings, in which like reference numbers represent corresponding parts throughout.

DETAILED DESCRIPTION OF PREFERRED EMBODIMENTS

In the following description, reference is made to the accompanying drawings which form a part hereof, and in which are shown, by way of illustration, several embodiments of the present invention. It is understood that other embodiments may be utilized and structural changes may be made without departing from the scope of the present invention.

The present invention improves the security feature of protection computer software in such a way that prevents generic and other hacks. It randomizes the entire software application protection code. Some method embodiments of the present invention also randomize license verification module, add and randomize a specific anti-hacking code, and randomize a protection code execution sequence(s). For randomization of the protection program code execution sequence the methods may use a number of different techniques, preferably code addition, instruction sorting, or instruction rotation. The same method embodiments can also select which instructions and how many instructions are randomized. Moreover, the methods select where the data is being stored, in which register, memory address and stack position, and also randomize variable offsets. Therefore, every time the software application, protected by the method of the present invention, is needed or runs, it generates a new protective algorithm randomly, rather than working with a fixed algorithm. Still another method embodiment of the present invention is used for interpreted code.

Other embodiments of the invention include computer software protection systems using the method embodiments of the present invention. The randomized protection code forces a potential adversary to analyze, understand and, if possible, hack each and every protected computer software application individually, thus multiplying the effort and time necessary to disable or remove the software security modules incorporated into the protected software application.

Figure 1:
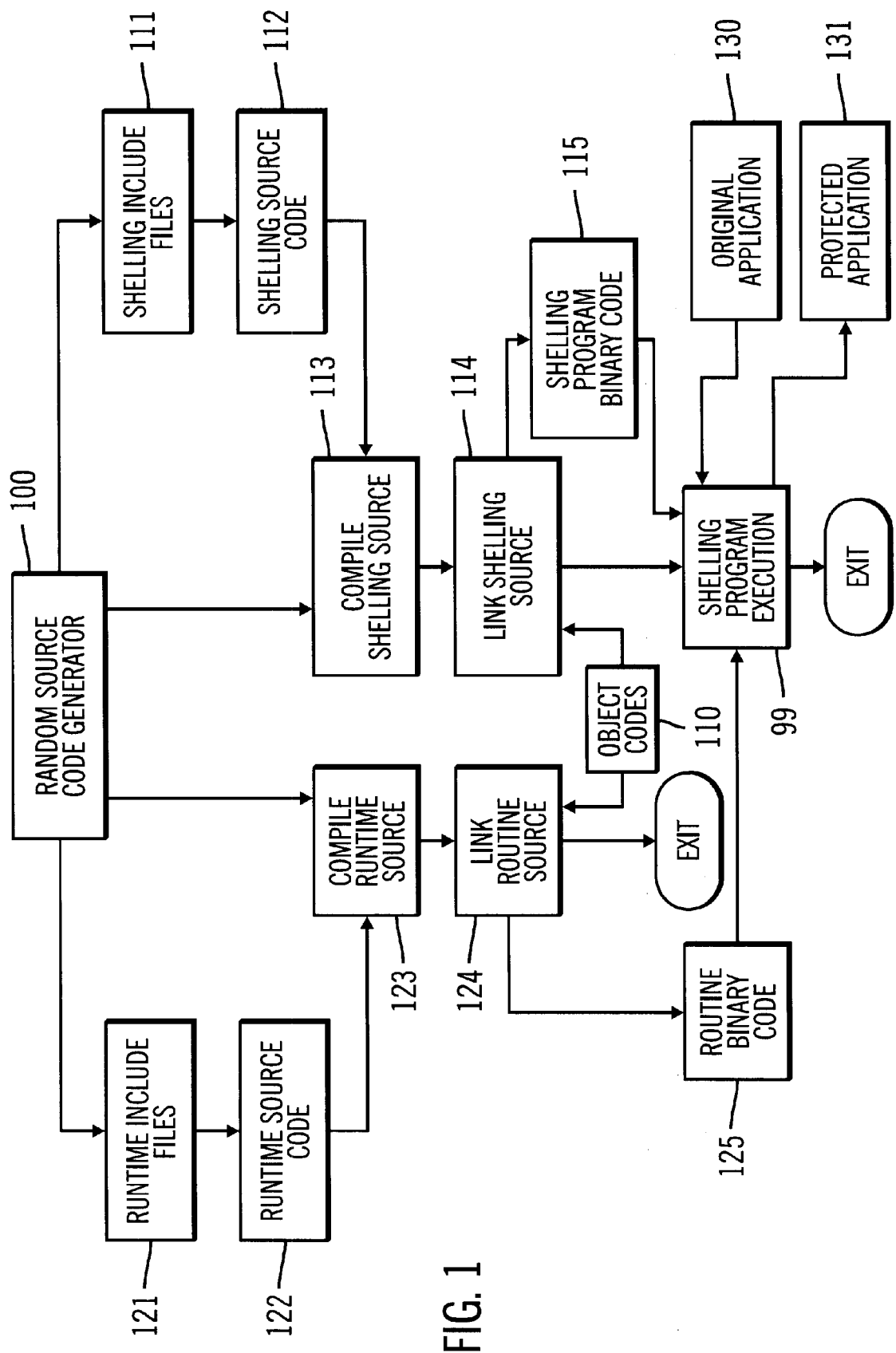
FIG. 1 is a flowchart of a preferred embodiment of the present invention.

FIG. 1 is a flowchart of the first preferred method embodiment of the present invention including a shelling system. A security vendor executes a random source code generator in step 100 to generate various shelling include source files 111. These shelling include source files 111 contain randomized instructions and/or data references which describe the shelling process. The various shelling include source files 111 are copied into or referred into a shelling source code 112 which is compiled in step 113 and linked, in step 114, with possible other objects 110 to create a unique shelling program 115 binary code. The random source code generator also generates various run-time include files 121, which contain randomized instructions and/or data references describing, for example, the license verification and startup functionality, as shown immediately below. The run-time include files 121 are copied into or referred into a run-time source 122, which is compiled in step 123 and linked in step 124, with possible other objects 110, to create a unique run-time binary code 125. The generated unique shelling program 115 as well as the run-time binary code 125 is shipped to the customer, typically a software developer. When the created shelling program 115 is executed in step 99, it reads the generated run-time binary code 125 as well as an original application 130, to create a run-time code of a new, uniquely protected application executable 131, that can be stored, sold or licensed, and delivered for a later execution by its end-users.

Figure 1A:
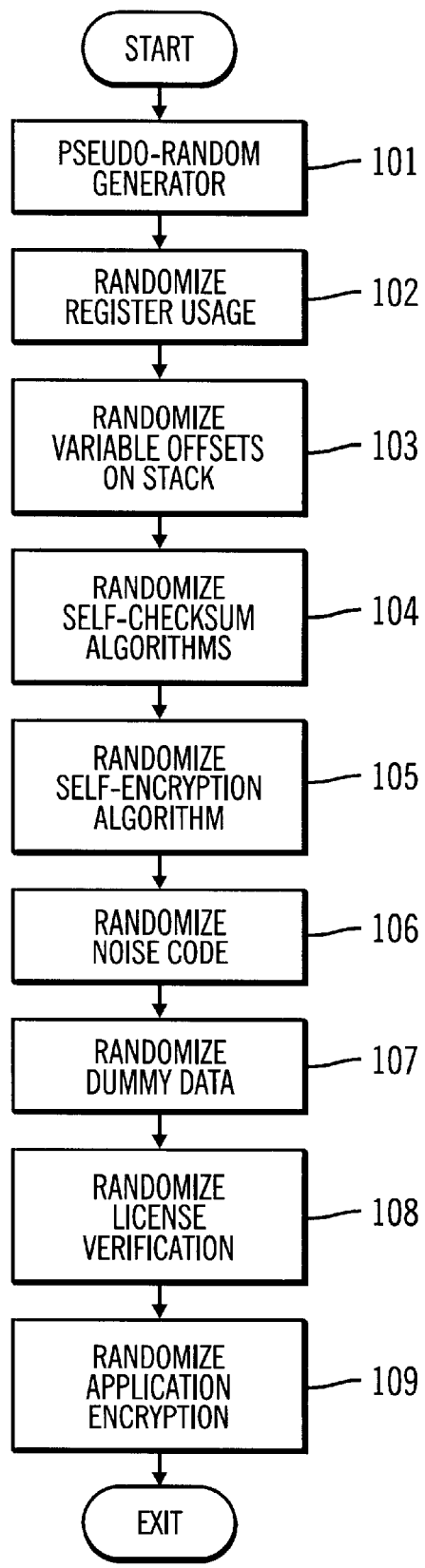
FIG. 1a is an exemplary flowchart showing performance of a random source code generator of FIG. 1.

The random source code generator includes various randomization routines, as shown in a flowchart of FIG. 1a, showing an exemplary method for use of the random source code generator. The randomization process is driven by a pseudo-random number generator (PRNG) 101, started in step 101, and used to create both the randomized shelling include source files 111 and the randomized run-time include files 121. Any conventional PRNG can be used, as long as the randomization output cannot be predicted by a potential cracker. The PRNG performs randomization of various source code elements to create the shelling include source files 111 and the run-time include files 121, for example, register usage in step 102, and variable offsets on a stack and in static memory data areas, in step 103. If employed, self-checksum is randomized in step 104, and self-encryption algorithms are randomized in step 105. To further blur the code, random "do-nothing" noise code is randomized in step 106, and dummy (not-used) data are randomized in step 107. The license verification module is also thoroughly randomized in step 108. When it is desired to encrypt the original application code, the encryption and corresponding decryption routine, found in the run-time binary code 125, including the encryption parameters, are randomized in step 109. Since the decryption routine is hidden inside the randomized run-time binary code 125, it is not readily available at the beginning of the executable code as in the conventional software security modules. Those skilled in the art of computers will readily recognize that many other elements of the executable source code of the shelling process may also be partially or fully randomized by the random source code generator.

Therefore, in this embodiment, each shelling program 115 is used for one particular application and applies a particular randomization technique. The shelling system of this method embodiment can create many shelling programs, one for each user, and store them for further use. This and the next method embodiment are applied to the elements of computer architecture, such as CPU registers.

Another embodiment includes a computer-based software protection system for run-time randomization and creation of a new algorithm and code each time an original software application 130 is protected. It uses the random source code generator for generating the plurality of randomized shelling include source files 111 and the plurality of randomized runtime include files 121, a compiler and a linker for compiling and linking the shelling source code 112 containing the randomized shelling include source files 111 to create the shelling program binary code 115, and for compiling and linking the run-time source code 122 including the randomized run-time include files 121 to create a run-time binary code 125, whereby the created shelling program is useable to read the generated run-time binary code 125 and the original software application 130, for creating a deliverable randomly protected software application executable code 131.

Figure 2:
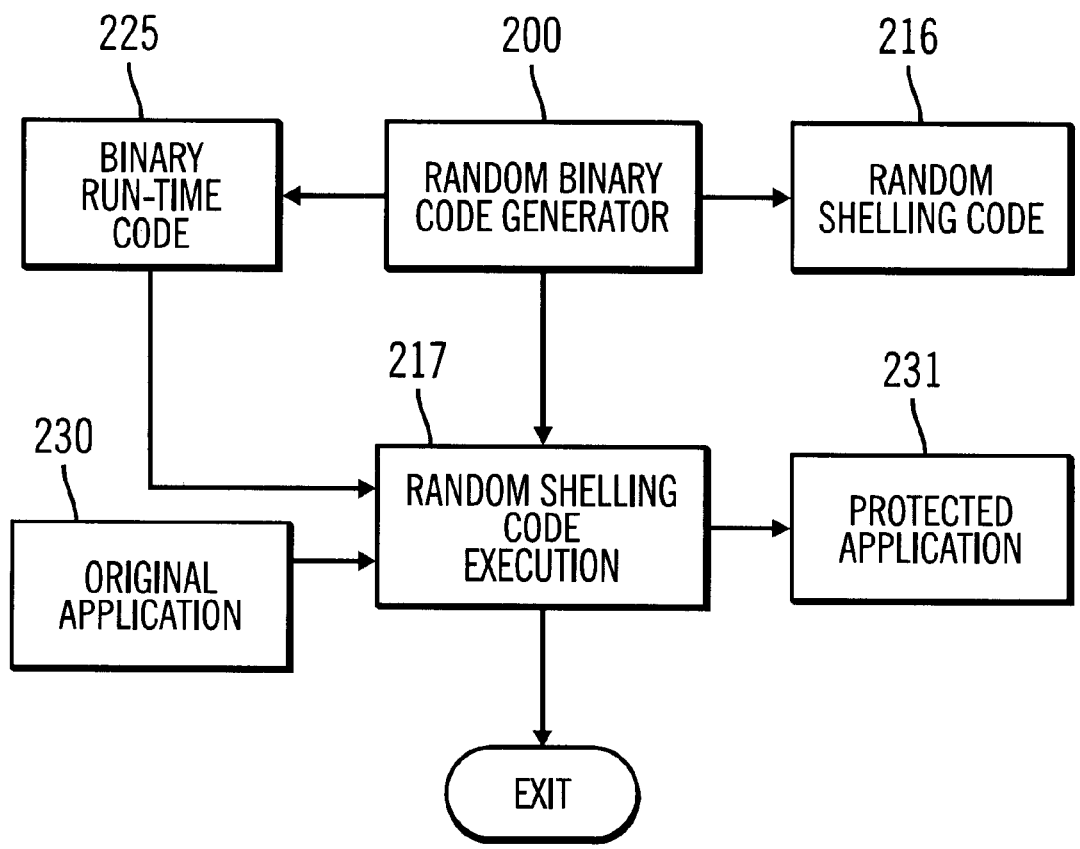
FIG. 2 is a flowchart of another preferred embodiment of the present invention.

In another method embodiment of the present invention, execution of which is shown in the flowchart of FIG. 2, a shelling program 215 itself contains a random binary code generator, started in step 200. This embodiment uses only one shelling program and, instead of storing a run-time code, it generates, at run-time, its own run-time code each time a tool is used. Because this embodiment is used at run-time, the random binary code generator is used on binary code.

The random binary code generator directly creates both a random shelling code 216 and a binary run-time code 225, and thus no compiler or linker is used. The shelling process then proceeds executing the newly generated random shelling code 216 in step 217, to read the generated random run-time code 225, as well as an original application 230, and create a run-time code of a uniquely protected application 231.

Figure 2A:
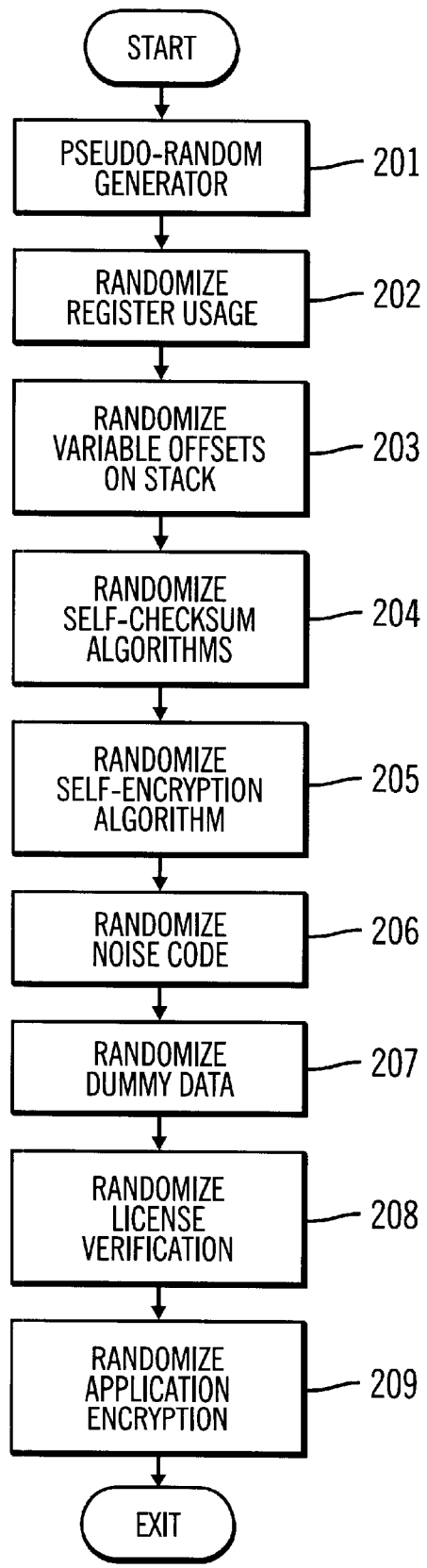
FIG. 2a is an exemplary flowchart showing performance of a random binary code generator of FIG. 2.

Similarly to the random source code generator of FIG. 1, the random binary code generator itself performs randomization of various code elements to create the shelling code 216 and the run-time code 225, as shown in the exemplary method for use of the random source code generator, shown in FIG. 2a. The randomization process is driven by a pseudo-random number generator, started in step 201. For example, register usage is randomized in step 202, and variable offsets on a stack and in static memory data areas are randomized in step 203. If employed, self-checksum is randomized in step 204 and self-encryption algorithms are randomized in step 205. To further blur the code, random noise code is randomized in step 206 and dummy data are randomized in step 207. The license verification module is also thoroughly randomized in step 208. When it is desired to encrypt the original application code, the encryption and corresponding decryption routine, including the encryption parameters, are randomized in step 209. Those skilled in the art of computers will readily recognize that many other elements of the various executable code, may also be partially or fully randomized by the random binary code generator.

This embodiment may also be used on the fly, for network-based applications stored in a client-server domain. There, the client's server uniquely randomizes each data packet it sends out to the network, such as the Internet, and no content is stored, in order to protect privacy.

Another embodiment is a computer-based software protection system for run-time randomization and creation of a new algorithm and code each time an original software application 230 is protected. The system has the shelling program, having the random binary code generator, for generating the random run-time shelling code 216 and the random binary run-time code 225, whereby the created random run-time shelling code 216 is useable to read the generated random run-time binary code 225 and the original software application 230, for creating the randomly protected software application 231.

Yet another embodiment of the present invention is used for random protection of interpreted language code of an original application. Shelling applications are limited and cannot be used in some environments, such as with interpreted language code. Moreover, some interpreted language code will not allow encryption and decryption, such as the code written in Java. Instead of run-time binary code, the interpreted code consists of interpretive bytecode, and the appropriate interpreter interprets instruction by instruction of the original application during run time. In the interpretative bytecode no compilation and linking of the original application is needed before the running of the original application. Therefore, this method embodiment of the present invention is applied not only to the elements of computer architecture, such as CPU registers, but also to language interpreters.

Figure 3:
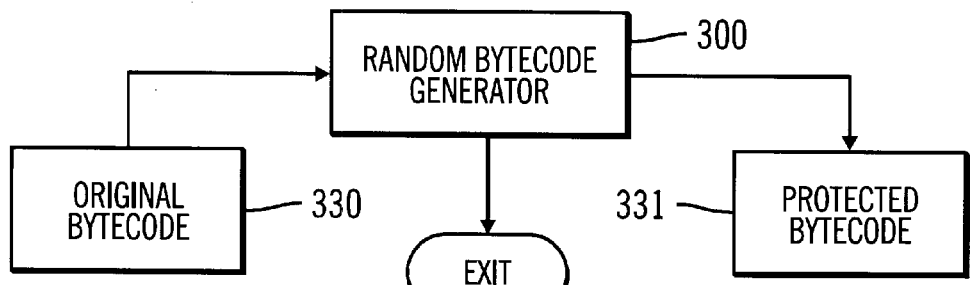
FIG. 3 is a flowchart of yet another preferred embodiment of the present invention.

FIG. 3 shows a flowchart of the method used for protection of interpreted language code, according to the present invention. The embodiment uses a random bytecode generator to read an original application's bytecode 330 in step 300 and create a uniquely randomized protected bytecode 331. To accomplish this task, the random bytecode generator also randomizes a protection code, embedded within, and combines the randomized original application's bytecode with the randomized protection code to create the randomly protected bytecode 331. The created randomly protected bytecode 331 can be delivered to customers or directly downloaded into the end-user's computer where it will be executed.

Figure 3A:
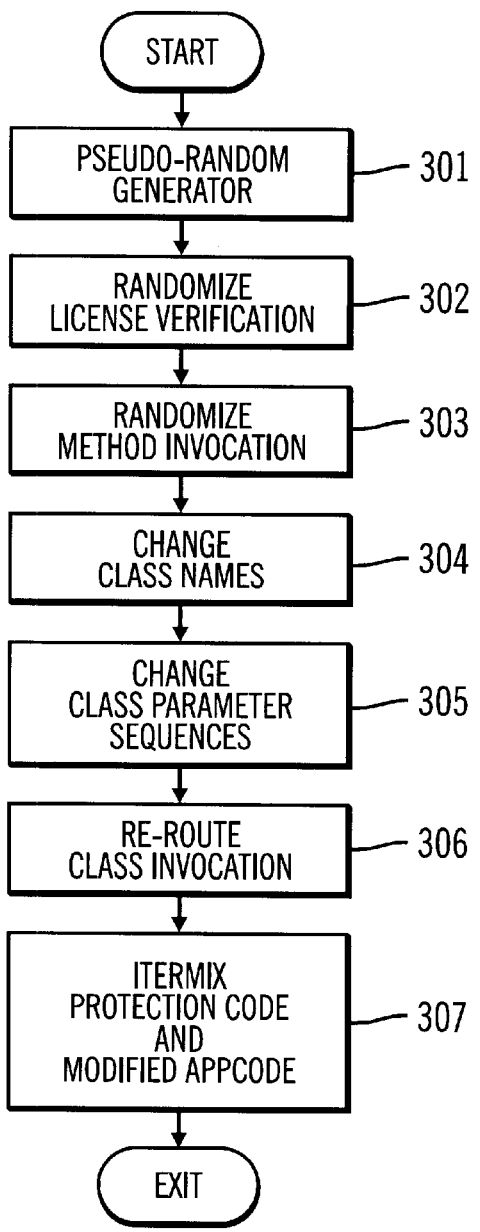
FIG. 3a is an exemplary flowchart showing performance of a random bytecode generator of FIG. 3.

FIG. 3a shows a possible implementation of the FIG. 3 embodiment of the present invention, to a method used for protecting JAVA bytecode. The randomization process is driven by a pseudo-random number generator, started in step 301 of FIG. 3a. The pseudo-random number generator randomizes various elements of the bytecode 330 of the original application, e.g. the license verification module in step 302, method invocation in step 303, changes in class names in step 304 and class parameter sequences in step 305. To further deter a cracker from recognizing the original code, the execution sequence and structure class invocations are re-routed in step 306 through randomly generated protection classes. The pseudo-random number generator also combines in step 307 the now-modified application bytecode, after the execution of steps 303–306, with the generated random protection bytecode from step 302, and preferably re-randomizes the combined software application, thus creating the protected computer software where the execution of the license verification module is different for each instance of the application, making it more difficult for a potential cracker to separate them and reconstruct the original application bytecode. Those knowledgeable in interpreted languages (e.g. JAVA, Visual Basic, Pascal, Prolog, SmallTalk etc.), will readily recognize other language elements that can be partially or fully randomized and function calls that can be re-routed, because this embodiment is used for interpreted code.

Another embodiment is a computer-based software protection system useable by a language interpreter software for run-time randomization and protection of an interpretative computer software application byte code, and creation of a new protective algorithm and code each time an original interpretative software application is protected. The system includes the random bytecode generator for reading the original interpretative software application's bytecode 330 and generating the randomly protected software application bytecode 331, and randomizing the protection code by the random bytecode generator, whereby a combination of the randomly protected software application bytecode and the randomized protection code is useable to create a randomly protected bytecode 331.

The system embodiments of the present invention provide tools available to security software vendors' customers to implement the run-time randomized protective method embodiments of the present invention, each time creating a new algorithm and code.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for run-time randomization of computer software protection programs, and creation of a new protective algorithm and code each time an original software application is protected, comprising the steps of:

generating a plurality of randomized shelling include source files and a plurality of randomized run-time include files;

compiling and linking the randomized shelling include source files to create a shelling program binary code;

compiling and linking the randomized run-time include files to create a run-time binary code; and executing the created shelling program binary code to read the generated run-time binary code and the original software application, for creating a deliverable randomly protected software application executable code.

2. The method of claim 1 wherein the step of generating a plurality of randomized shelling include source files and a plurality of randomized run-time include files comprises the steps of:

executing a random source code generator means;

executing a pseudo-random number generator means;

selecting instructions to be randomized in the shelling include source files and the randomized run-time include files;

randomizing the shelling include source files and the run-time include files execution sequences by code addition, instruction sorting, or instruction rotation; and randomizing the shelling include source files and the run-time include files data storage locations including registers, memory addresses and stack positions, and variable offsets on a stack and in static memory data areas;

thereby, every time the protected software application runs, generating a new protective algorithm and code randomly.

3. The method of claim 2 wherein the step of generating a plurality of randomized shelling include source files and a plurality of randomized run-time include files further comprises the step for adding and randomizing a "do-nothing" noise code and dummy data.

4. The method of claim 2 wherein the step of generating a plurality of randomized shelling include source files and a plurality of randomized run-time include files further comprises the step for randomizing self-checksum, and self-encryption algorithms.

5. The method of claim 2 wherein the step of generating a plurality of randomized shelling include source files and a plurality of randomized run-time include files further comprises the step for creating a randomized license verification module.

6. The method of claim 2 wherein the step of generating a plurality of randomized shelling include source files and a plurality of randomized run-time include files further comprises the step for creating an encryption code and a decryption code for the original software application.

7. A computer-based software protection system for run-time randomization and creation of a new algorithm and code each time an original software application is protected, comprising:

a random source code generator means for generating a plurality of randomized shelling include source files and a plurality of randomized run-time include files;

a compiler means and a linker means for compiling and linking the randomized shelling include source files to create a shelling program binary code; and a compiler means and a linker means for compiling and linking the randomized runtime include files to create a run-time binary code;

whereby the created shelling program being useable to read the generated run-time binary code and the original software application, for creating a deliverable randomly protected software application executable code.

8. The computer-based software protection system of claim 7 wherein the random source code generator means comprises a pseudo-random number generator means for:

selecting instructions to be randomized in the shelling include source files and the randomized run-time include files;

randomizing the shelling include source files and the run-time include files execution sequences by code addition, instruction sorting, or instruction rotation; and randomizing the shelling include source files and the run-time include files data storage locations including registers, memory addresses and stack positions, and variable offsets on a stack and in static memory data areas;

thereby, every time the protected software application runs, generating a new protective algorithm and code randomly.

9. A method for run-time randomization of computer software protection programs, and creation of a new protective algorithm and code each time an original software application is protected, comprising the steps of:

running a shelling program, having a random binary code generator means, for generating a random run-time shelling code and a random binary run-time code; and executing the random run-time shelling code to read the generated random binary runtime code and the original software application, for creating a randomly protected software application.

10. The method of claim 9 wherein the step of running a shelling program, having a random binary code generator means, for generating a random run-time shelling code and a random binary run-time code comprises the steps of:

executing a random source code generator means for executing a pseudo-random number generator means;

selecting instructions to be randomized in the random run-time shelling code and the random binary run-time code;

randomizing the run-time shelling code and the binary run-time code execution sequences by code addition, instruction sorting, or instruction rotation; and randomizing the run-time shelling code and the binary run-time code data storage locations including registers, memory addresses and stack positions, and variable offsets on a stack and in static memory data areas;

thereby, every time the protected software application runs, generating a new protective algorithm and code randomly.

11. The method of claim 10 wherein the step of running a shelling program, having a random binary code generator means, for generating a random run-time shelling code and a random binary run-time code, further comprises the step for adding and randomizing a "do-nothing" noise code and dummy data.

12. The method of claim 10 wherein the step of running a shelling program, having a random binary code generator means, for generating a random run-time shelling code and a random binary run-time code, further comprises the step for randomizing self-checksum, and self-encryption algorithms.

13. The method of claim 10 wherein the step of running a shelling program, having a random binary code generator means, for generating a random run-time shelling code and a random binary run-time code, further comprises the step for creating a randomized license verification module.

14. The method of claim 10 wherein the step of running a shelling program, having a random binary code generator means, for generating a random run-time shelling code and a random binary run-time code, further comprises the step for creating an encryption code and a decryption code for the original software application.

15. The method of claim 10 wherein the method being useable to randomize each data packet sent to a network, in order to protect privacy.

16. A computer-based software protection system for run-time randomization and creation of a new algorithm and code each time an original software application is protected, comprising:

a shelling program, having a random binary code generator, for generating a random run-time shelling code and a random binary run-time code; and whereby the created random run-time shelling code being useable to read the generated random run-time binary code and the original software application, for creating a randomly protected software application.

17. The computer-based software protection system of claim 16 wherein the random binary code generator comprises a pseudo-random number generator means for:

selecting instructions to be randomized in the random run-time shelling code and the random binary run-time code;

randomizing the run-time shelling code and the binary run-time code execution sequences by code addition, instruction sorting, or instruction rotation; and randomizing the run-time shelling code and the binary run-time code data storage locations including registers, memory addresses and stack positions, and variable offsets on a stack and in static memory data areas;

thereby, every time the protected software application runs, generating a new protective algorithm and code randomly.

18. The computer-based software protection system of claim 16 wherein the system being useable to randomize each data packet sent to a network, in order to protect privacy.

19. A method useable by a language interpreter software for run-time randomization and protection of interpretative computer software application byte code, and creation of a new protective algorithm and code each time an original interpretative software application is protected, comprising the steps of:

reading the original interpretative software application's bytecode and generating a randomly protected software application bytecode, by a random bytecode generator means;

randomizing a protection code by a random bytecode generator means; and combining the randomly protected software application bytecode with the randomized protection code to create a randomly protected bytecode.

20. The method of claim 19 wherein the step of randomizing the original interpretative software application's bytecode comprises the steps of:

executing a random bytecode generator means for executing a pseudo-random number generator means;

randomizing the original interpretative software application's bytecode method invocation, changing class names and class parameter sequences, re-routing the original interpretative software application's bytecode execution sequence and structure class invocations through randomly generated protection classes; and the step of randomizing the protection code comprises the step of randomizing the license verification module;

thereby, every time the protected interpretative computer software application runs, generating a new protective algorithm and code randomly.

21. The method of claim 20 wherein the step of combining the randomly protected software application bytecode with the randomized protection code to create a randomly protected bytecode further comprises the step of re-randomizing the combined randomly protected bytecode.

22. A computer-based software protection system useable by a language interpreter software for run-time randomization and protection of an interpretative computer software application byte code, and creation of a new protective algorithm and code each time an original interpretative software application is protected, comprising:
- a random bytecode generator for reading the original interpretative software application's bytecode and generating a randomly protected software application bytecode, and randomizing a protection code by a random bytecode generator; and
- whereby a combination of the randomly protected software application bytecode and the randomized protection code being useable to create a randomly protected bytecode.

23. The computer-based software protection system of claim 22 wherein the random bytecode generator comprises a pseudo-random number generator means for:
- randomizing the original interpretative software application's bytecode method invocation, changing class names and class parameter sequences, re-routing the original interpretative software application's bytecode execution sequence and structure class invocations through randomly generated protection classes; and
- randomizing the license verification module;
- thereby, every time the protected interpretative software application runs, generating a new protective algorithm and code randomly.

* * * * *